United States Patent [19]

McCorsley, III

[11] 3,993,828

[45] Nov. 23, 1976

[54] POLYESTER, FIBERGLASS-REINFORCED COMPOSITE LAMINATE

[75] Inventor: Clarence Curtis McCorsley, III, Asheville, N.C.

[73] Assignee: Akzona Incorporated, Asheville, N.C.

[22] Filed: Jan. 23, 1975

[21] Appl. No.: 543,305

Related U.S. Application Data

[63] Continuation of Ser. No. 333,187, Feb. 16, 1973, abandoned.

[52] U.S. Cl. ............................. 428/236; 428/251; 428/252; 428/265; 428/268; 428/285; 428/287
[51] Int. Cl.² ..................... B32B 15/00; B32B 17/00
[58] Field of Search ............... 161/92, 93, 156, 194, 161/192, 231; 428/233, 236, 251, 252, 265, 268, 285, 287

[56] References Cited

UNITED STATES PATENTS

| 3,255,875 | 6/1966 | Tierney | 161/231 |
| 3,663,341 | 5/1972 | Veneziale | 161/93 |
| 3,691,000 | 9/1972 | Kalnin | 161/93 |

*Primary Examiner*—Marion E. McCamish
*Attorney, Agent, or Firm*—Craig & Antonelli

[57] ABSTRACT

A fiber-reinforced polymeric resin composite laminate which comprises at least one reinforcing layer of a saturated polyester fiber arranged between at least two reinforcing layers of fiberglass fiber. The fibers are bonded together by a synthetic resin, and the laminate contains from 4 to 16 reinforcing fiber layers with an equal number of reinforcing layers of the fiberglass fiber arranged on each side of the laminate.

22 Claims, 11 Drawing Figures

POLYESTER, FIBERGLASS-REINFORCED COMPOSITE LAMINATE

CROSS REFERENCE TO RELATED APPLICATION

This is a continuation of application Ser. No. 333,187 filed Feb. 16, 1973 which application is now abandoned.

This invention relates to the production of fiber-reinforced synthetic plastics and in particular to a laminate composite containing a unique arrangement of fiberglass and polyester fiber reinforcement layers bonded together by a synthetic resin and to a process for producing such laminate composites.

The use of fiberglass fibers or particles as a reinforcement for plastic materials, particularly, polyester resins, is well known in the reinforced plastics industry. These reinforced plastic materials are often referred to as fiberglass laminates or composites. The fiberglass reinforced laminate exhibits good tensile strength and tensile modulus and consequently, possesses good flexural strength and stiffness. However, these fiberglass laminates have poor impact strength and low abrasion resistance and chemical resistance. Notwithstanding, these disadvantages, the use of fiberglass fibers or particles as reinforcement material have long dominated the reinforced plastic market.

In recent years, many attempts have been made to overcome the disadvantages of the use of fiberglass as reinforcement for plastic materials by incorporating additional reinforcement materials such as fibers or films of synthetic polymers, powders or inorganic fillers and the like, in the laminate structure. In some cases the fiberglass has been completely replaced by synthetic polymeric fibers and in others, a synthetic polymeric fiber has been used in combination with the fiberglass fibers as reinforcements. The patent to Williams (U.S. Pat. No. 2,765,250) is representative of one of the earlier attempts to produce laminated structures comprising a laminate of polymeric linear terephthalate esters and a copolyester. This patent discloses a process wherein a sheet of polymeric linear terephthalate is coated with a copolyester of at least one acrylic dicarboxylic acid and at least one symmetrical aromatic dicarboxylic acid with a polymethylene glycol. The laminates obtained from this procedure were primarily used as coverings or gasket materials where resistance to chemical attack by aromatic and aliphatic hydrocarbon liquids is needed rather than as structural members. In one embodiment, this patent also discloses the use of a fiberglass layer to further reinforce the laminate.

Generally structural laminates reinforced solely with fiber of synthetic polymers have not been favorably accepted by the industry. For example, polyester fibers are not widely used in the reinforced plastic industry because these fibers have a very low tensile strength and tensile modulus as compared to the fiberglass fibers. Consequently, laminates which are made with only these reinforcing fibers have a very low flexural strength and flexural modulus. Another drawback of polyester fiber reinforced laminates is that these laminates have an elongation of about 20 or 30% in contrast to fiberglass fiber reinforced laminates which have an elongation of about 2%. However, because the polyester fiber reinforced laminate has a high degree of elongation, the laminate exhibits very high impact strength. Also, polyester fiber laminates have very good abrasion resistance and chemical resistance in comparison with fiberglass reinforced laminates.

The more recent patent to Green et al (U.S. Pat. No. 3,556,922) describes the preparation of a fiber-resin composite containing carbocyclic aromatic polyamide fibers and inorganic fibers such as ceramic fibers made of glasses or carbides, graphite fibers, nitride fibers and metal fibers. According to this disclosure, the inorganic fibers are located within the portion of the composite which will be subjected to compressive stress. In order to obtain the structural strength desired, the composite contains at least about 10 volume percent of a thermoplastic or thermosetting resin, preferably a thermosetting resin; high strength, high modulus carbocyclic aromatic polyamide fibers; and high strength, high modulus inorganic fibers, with the inorganic fibers being located within a portion of the composite where they will be subjected to compression along their axes when the composite is loaded. The composite structure obtained in accordance with this procedure is described as having a substantial increase in structural strength as compared with structures of fibers of the carbocyclic aromatic polyamide alone or the inorganic material alone.

Notwithstanding the many advances made in the area of fiber reinforced plastics, there are still many applications where the use of reinforced plastics is curtailed because of the cost and the lack of a proper combination of physical and chemical properties. This is particularly true where impact resistance and structural stiffness as well as abrasion resistance and chemical resistance are required.

Advantageously, this invention provides a laminate composite which can be tailored to suit the needs of many different applications in the reinforced plastic field, while still providing a laminate as stiff, as economical, and as light as the standard fiberglass laminate in the market today.

In accordance with this invention, it has been found that incorporating both fiberglass fibers and polyester fibers as reinforcement materials in a proper geometric sequence within a binder resin, particularly a crosslinkable unsaturated polyester resin, provides substantially improved impact resistance and stiffness to the laminate without any substantial increase in weight or material cost.

Thus, this invention contemplates a fiber-reinforced polymeric resin laminate comprising at least two adjacent reinforcing layers of a saturated polyester fiber arranged between at least two reinforcing layers of fiberglass fiber and bonded together by a synthetic resin, the polyester fiber having a tenacity of from about 2 to 10 grams per denier, an elongation at break of from about 3 to about 50% and a tensile modulus at 1 percent elongation of from about 60 to about 150 grams per denier and the fiberglass fiber having a tenacity of from about 5 to 8 grams per denier, a tensile modulus of at least about $10 \times 10^6$ p.s.i., and an elongation at break not greater than about 3%. Also this invention contemplates a synthetic resin-bonded laminate comprising at least one of the reinforcing layers of the saturated polyester fiber arranged in the center with at least two of the reinforcing layers of fiberglass fiber on each side.

In one embodiment of this invention wherein the interior portion of the laminate is reinforced with polyester fiber and the exterior portions are reinforced with fiberglass, it has been found that the laminate possesses the following superior properties as compared to a fiberglass reinforced laminate and a polyester fiber reinforced laminate: (1) increased load carrying under flexure, (2) less deflection, and (3) greater Izod impact load. Also this laminate has the same flexural modulus as a laminate reinforced solely with fiberglass and a much higher Charpy impact load than the fiberglass reinforced laminate. Advantageously, it has also been found that the chemical resistance and abrasion resistance of the laminates of this invention can be substantially increased by providing at least one reinforcing layer of the polyester fiber on the exterior or outer portions of the laminate. In fact, this arrangement will provide the same initial chemical resistance and abrasion resistance as a laminate purely reinforced with polyester fiber. Furthermore, in this further embodiment, the laminate will also carry more load in flexure than either of the laminates containing either fiberglass or polyester fibers as a single reinforcing material and will have a flexural deflection at least the same as the deflection of the better of the two single fiber reinforced laminates. Furthermore, this embodiment also has a Charpy impact resistance as high or nearly as high as either of the highest of the two laminates containing a single fiber reinforcement and has more Izod impact resistance than either of the single fiber reinforced laminates. Advantageously, in these embodiments of the invention, the same weight of fiber (that is the combined weight of the fiberglass and the polyester fiber) is used as within the laminates using a single fiber reinforcement.

In general, the ratio of polyester fiber to fiberglass fiber on a volume to volume basis should be on the order of 1:1 to 20:1. This corresponds to a weight to weight ratio on the order of from 1:1.8 to 11:1. Preferably the laminates of this invention are comprised of from about 25 to 75 weight per cent and more preferably from about 40 to about 70 weight percent, of the resin binder or matrix, and from 75 to 25 weight percent, and more preferably about 60 to about 30%, of the reinforcement fibers.

Furthermore it has been found that at least four reinforcement fiber layers are required for obtaining the necessary combination of properties in the laminate of this invention. A suitable number of reinforcement fiber layers is from 4 to 16 and preferably from 6 to 12. It will be understood that a larger number of layers may, in some instances, be desirable, but for most purposes a higher degree of lamination is unnecessary. Also if less than four layers are used the laminate is usually too thin to provide measurable impact resistance.

The fiber-reinforced polymeric laminate of this invention may be produced by a number of various laying-up procedures. In general, the laminate is formed in a mold which can be made of steel, rubber, a fiberglass reinforced plastic, Teflon or the like. Usually a mold release coating of some type such as polyvinyl alcohol, a Teflon dispersion, wax or the like is applied to the mold if the laminated elements tend to stick to the mold. In general the reinforcement layers may be laminated in one of the following two ways:

WET LAY-UP BY HAND

In this procedure the reinforcement layers are cut to the shape of the mold and the number of reinforcing fiber layers is chosen depending on the thickness of the laminate desired. The reinforcement layers are then weighed and the amount of liquid resin binder required to wet the fibers is calculated. When a thermosetting resin such as unsaturated polyester (e.g. Marco No. 480) is employed as the binder resin, this resin is initially activated by the addition of a peroxide catalyst, for example, methyl ethyl ketone peroxide. The amount of peroxide added depends on the amount of time required to lay-up the laminate. For example, 0.5% by weight of methyl ethyl ketone peroxide (based on the weight of the resin binder) will provide about 30 minutes time for laying-up; whereas, about 1% by weight of the methyl ethyl ketone peroxide will provide about 20 minutes laying-up time. Initially a small amount of the resin is mixed with a high peroxide content and applied to the mold surface by spray or brush. This is called a gel coat. Also, the gel coat may contain metallic flakes, pigments and the like. The gel coat is allowed to dry until it is tacky to touch (that is allowed to polymerize) and then a fiber veil of fiberglass is layered on the surface of the gel coat. This veil is usually about 10 mils thick. Once the veil is in place the lower content peroxide resin binder is applied in sufficient amounts to coat the surface. At this time the first layer of reinforcement fiber is layered on and additional resin binder applied. This initial layer is then rolled with a roller to remove air and the next reinforcement layer of fiber is applied and more resin is added and then rolled out. This application of resin and reinforcement and removal of air is continued until the desired thickness of the laminate is obtained. The composite laminate is then allowed to cure-up and subsequently removed from the mold in approximately 1 to 6 hours.

SPRAY-UP PROCEDURE

In this procedure the mold preparation and gel coat steps are the same as in the above-noted procedure, but the reinforcement fiber and the resin are applied at the same time using a chopper spray gun. This gun chops up the tow or roving of fiber as it is being pulled off a spool and sprays the chopped up fiber together with the activated resin binder onto the mold surface. This gun also meters the amount of activated resin so that the resin-to-fiber ratio is maintained. In this procedure, each layer of reinforcing fiber and resin binder is usually rolled out and more resin and fiber are sprayed to give the desired thickness with alternate spray guns being employed to produce different reinforcement layers. It will be appreciated that this procedure may, in some cases, be combined with the hand lay-up procedure in the preparation of the composite laminate.

The sequence or arrangement of reinforcement layers in one basic embodiment of the laminate composite of this invention may be represented by the following formula:

$$F(P)_xF \tag{I}$$

wherein P represents the polyester fabric fiber layer, F represents the fiberglass fiber layer and $x$ represents an integer, having a value from 2 to 14. It will also be understood that there are a number of variations in the arrangement of the reinforcement layers that are basically similar to the arrangement designed by formula I. For example, the following formula represents a sequence of layers of a variation in the basic embodiment designated by formula I:

$(F)_{x'} 5P(F)_{x'}$                                    (II)

wherein $x'$ represents the number of layers of the fiberglass. For example, when $x'$ is 3, the sequence of layers would be as follows:

FFFPPPPPPFFF

It will be appreciated that equal numbers of the fiberglass layers are applied on each side of the polyester layers in order to provide a symmetrical reinforcement of the composite structure.

The other basic embodiment of the composite laminate of this invention differs from that represented by formula I in that one or more additional reinforcement layers of polyester fiber are applied to the fiberglass reinforcement layers to enhance the abrasion resistance and chemical resistance of the composite. This embodiment of the invention may be represented by the following formula:

$PF(P)_xFP$                                          (III)

wherein $x$ represents an integer designating the number of reinforcement layers of the polyester fiber. It will be appreciated that in place of the single outer reinforcement layer of polyester fiber, two polyester reinforcement layers may be employed. Generally, one layer provides the desired improved abrasion and chemical resistance to the laminate.

The reinforcing polyester fiber suitable for the purposes of this invention is preferably saturated polyethylene terephthalate. Other carbocyclic aromatic polyesters may be used. Among these other linear polyesters are polyethylene adipate; poly-1, 4-cyclohexylene dimethylene adipate; poly-1, 4-cyclohexylene dimethylene terephthalate; polyethylene isoterephthalate; poly-Co-ethylene-phthalate-isophthalate, and the like. Other suitable polyester fibers are exemplied in U.S. Pat. Nos. 2,465,319; 2,901,466; 2,744,089; and 3,018,262.

The polyester reinforcing fiber of this invention is characterized as follows:

| Properties | Preferred | Most Preferred |
|---|---|---|
| Denier per filament | 1.5–30 | 6–15 |
| Elongation at break (%) | 3–50 | 15–25 |
| Tenacity (grams/denier) | 2–10 | 5–8 |
| Modulus at 10% elongation (grams/denier) | 5–100 | 30–70 |
| Modulus at 1% elongation (grams/denier) | 6–150 | 90–150 |
| Tow size (total denier) | 1000–40,000 | 20,000–35,000 |

The fiberglass fiber useful as reinforing fiber includes a number of commercially available types of fiberglass, e.g. types of fiberglass, e.g. types A, C, D, E and S. These fibers are characterized in having a tensile modulus in the range of from 10–14 × $10^6$ psi, a tenacity varying from 5 to 8 grams per denier and an elongation at break of not greater than about 3%.

It will be appreciated that the reinforcing fibers are usually employed in the form of woven mats and that many different types of weaves may be used. For example, plain, twill, long shaft satin, plain satin, basket, unidirectional and mock-leno are representative weaves for these reinforcing layer fibers. Also, these fibers may be used in non-woven form such as a chopped strand or continuous strand mat. For example, a fiberglass chopped strand mat is commonly employed in the preparation of fiberglass reinforced laminates. Preferably, the polyester fiber is employed in the form of a woven fabric with a plain weave.

The binder resin used to bond the reinforcing layers of fiber together preferably is an unsaturated (reactive) polyester resin which is curable at room temperature by the addition of a peroxide catalyst.

Such resins are mixtures of polyesters or polycondensation products of dicarboxylic acids with dehydroxy alcohols and a compatible copolymerizable ethylenically unsaturated monomer. Generally the polyester component is dissolved in the monomer component. These two components react or copolymerize in the presence of a free radical catalyst such as a peroxide to form a rigid, infusible thermoset resin. Representative of the dicarboxylic acids are the unsaturated dibasic acids such as fumaric acid, maleic acid, maleic anhydride and the like; and saturated dibasic acids such as phthalic anhydride, isophthalic acid, adipic acid, orthophthalic acid and the like. Suitable glycols include ethyleric glycol, diethylene glycol, propylene glycol and the like. Among the copolymerizable monomers are styrene, diallyl phthalate, methyl methacrylate and the like.

The peroxides useful for catalyzing the polyester reaction system and to initiate the copolymerization reaction are organic peroxides which decompose to release free radicals. Among the most commonly used peroxides are methylethyl ketone peroxide, benzoyl peroxide and cumene hydroperoxide. Other suitable peroxides are 2, 4-dichlorobenzoyl peroxide, and cyclohexonone peroxide, and the like. These peroxides may be used along or in conjunction with accelerators such as cobalt octoate, cobalt napthenate or dimethyl amine or the like. It will be appreciated, however, that a number of additional binder resins including thermoplastic resins such as nylons, polystyrene and styrene-acrylonitrile copolymers and other thermosetting resins such as epoxides, melamine, phenolics, polyimides, silicone, and diallyl-phthalate resins may be used with appropriate catalyst systems. Also, a single resin or a mixture of these resins may be employed as the binder. Suitable solvents and plasticizers may be added to this resin when required.

It will be further understood that various conventional additives such as dyes, fillers, ultraviolet stabilizers, antioxidants and the like can be incorporated in the fibers, the binder resin and/or the laminate and that coatings, sizes, dips and the like can be applied to the surface of the fibers.

The fiber-reinforced laminates of this invention will be further understood from the following detailed description of several preferred embodiments and with reference to the accompanying drawings wherein.

Figure 1:
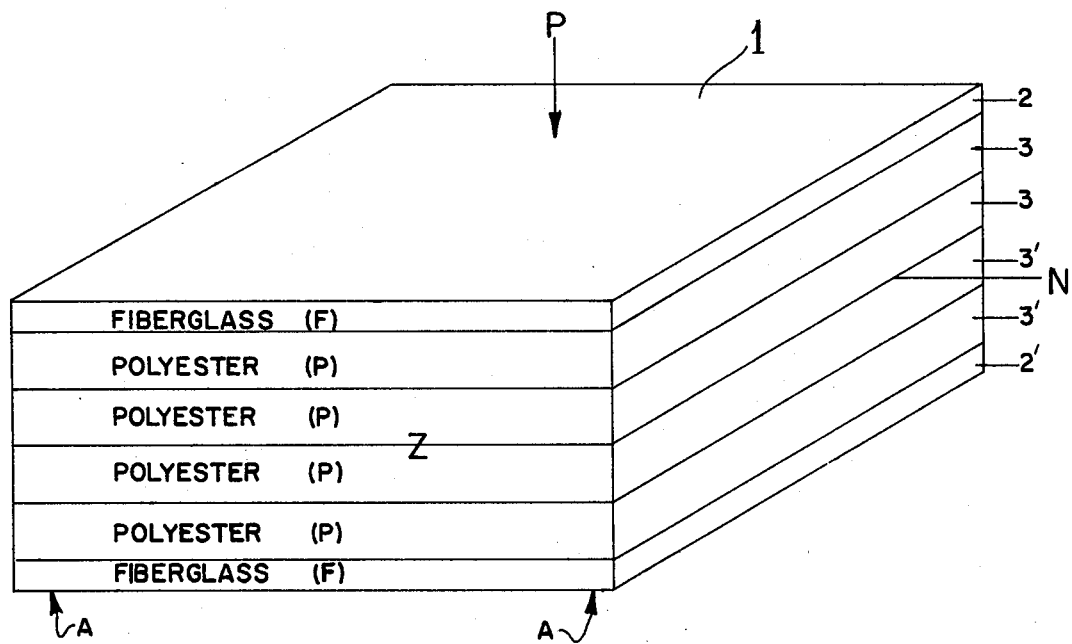
FIG. 1 is a schematic view of a composite laminate of the invention in the form of a sheet having the arrangement of reinforcing fibers represented by the formula $F(P)_xF$.

FIG. 1 shows one preferred composite laminate of the invention which exhibits improved impact resistance and stiffness when used as a load bearing member under a load P. In this composite laminate, which is supported at points A, the upper fiberglass fiber layer 2 is placed under compression and the lower fiberglass fiber layer 2' is subjected to tension. The interior polyethylene terephthalate fiber layers 3 and 3' are positioned between layers 2 and 2' and are immediately above and below the neutral axis N. In this arrangement layers 3 are in compression and layers 3' are in tension. At point Z the greatest vertical and horizontal shear stress is developed. The horizontal shear stress is a direct delamination force and the vertical shear tends to break the fiber across its axis. In the layer sequence of PET and fiberglass (F) the laminate provides a beam where the advantages of each fiber can be utilized most efficiently. Since the fiberglass fiber has superior tensile properties but poor shearing performance and the polyethylene terephthalate fiber has superior elastic and energy absorption properties the fiberglass fiber has been placed in the exterior portions of the composite and the polyethylene terephthalate fiber has been placed in the interior close to the neutral axis. Advantageously with this arrangement the polyethylene terephthalate can be used to make the beam thicker since it has a density substantially lower than that of fiberglass.

It will be recognized that although the neutral axis N is shown in the center of the laminate, in practice the neutral axis may be displaced from the center. Thus, when the tensile modulus of a given portion of the laminate is greater than the compression modulus, the neutral axis will shift from the center to that portion of the laminate under tension only.

Figure 2:
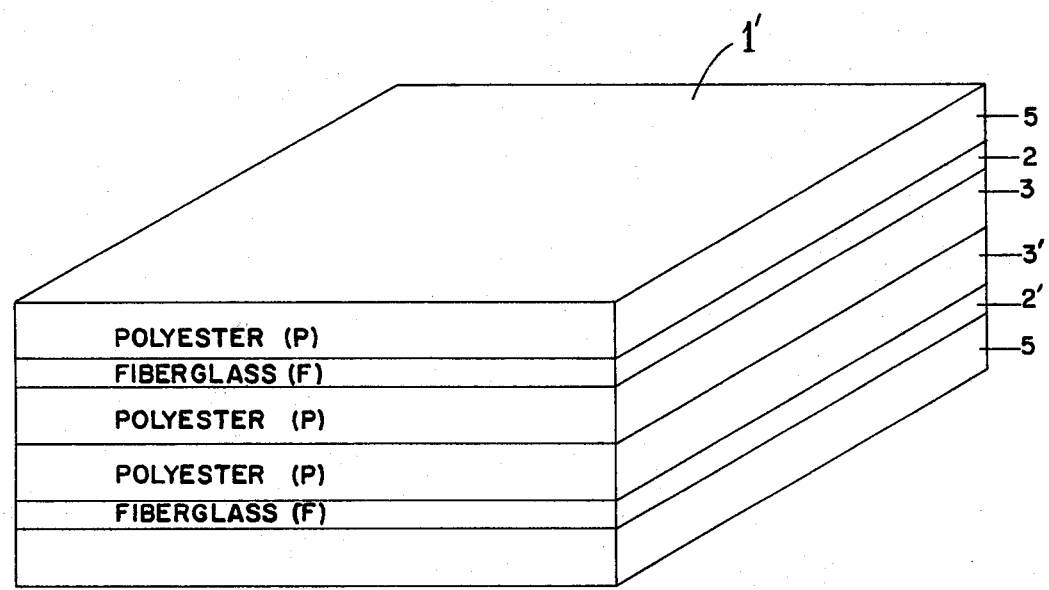
FIG. 2 is a schematic view of another composite laminate of the invention in the form of a sheet having the arrangement of reinforcing layers represented by the formula $PF(P)_xFP$.

In FIG. 2 there is shown a specific embodiment of the invention encompassed by formula III wherein six reinforcing fiber layers are provided. In this laminate two polyester fiber layers 5 are added to the exterior to provide improved abrasion and chemical resistance to the resulting composite. The arrangement of the fiberglass fiber layers 2 and 2' and the polyethylene terephthalate fibers 3 and 3' are similar to those in the embodiment of the invention shown in FIG. 1.

Several different embodiments of the composite laminate of the invention have been prepared and evaluated. The following examples show the improved combination of physical and chemical properties possessed by these laminates.

As indicated above, the preferred polyester fiber used as a reinforcing layer in this invention is prepared from saturated polyethylene terephthalate. In the examples that follow a woven roving of ENCRON polyester was employed. This fabric was prepared from a tow containing 1523 filaments and was woven in a four ends per inch warp by four ends per inch fill construction. The fabric weighed 21 oz./yd.$^2$ and had a thickness of 0.0530 inches. The drawn yarn prior to weaving had the following physical properties:

| Denier per Filament | 13.42 |
|---|---|
| Elongation at break (%) | 32% |
| Tenacity | 33 4.4 grams per denier or 77,700 psi |
| Modulus at 10% elongation | 33 grams per denier or 583,000 psi |
| Modulus at 1% elongation | 98 grams per denier. |

The resin binder employed was an unsaturated polyester all purpose resin supplied by W. R. Grace and Company and sold under the identification of "Marco All Purpose Polyester Resin No. 480". This resin contains styrene monomer. This resin has the following physical properties in the cured state:

| Tensile Strength (psi × $10^3$) | 8.6 |
|---|---|
| Tensile modulus (psi × $10^5$) | 0.5 |
| Flexural strength (psi × $10^3$) | 12.0 |
| Flexural modulus (psi × $10^6$) | 0.44 |
| Density (grams/c.c.) | 1.15 |
| Impact strength (Charpy unnotched ft.-lbs./in.) | 0.3 |

The catalyst employed to effect cross-linking and setting up of the binder resin in methylethylketone peroxide in a 60% dimethyl phthalate solution (Lupersol DDM made by Penwalt Chemical Co.).

The fiberglass reinforcement layers were prepared by using a fiberglass fabric in the form of a woven roving with a construction of five ends per inch warp and four ends per inch fill. The glass type employed was E and the fabric weight was 24 ounces per square yard.

In the examples the composite laminates of the invention were prepared by using the following procedure: A silicon rubber mold, female type, was employed. The inside dimensions of the mold were 15 inches long, 10 inches wide, and 1 inch deep. The reinforcement layers were cut in a manner such that the warp yarn of the fabric would be layed-up parallel to the 15 inch side of the mold. The fabrics were weighed and based on this weight the resin was weighed to give a fabric content of 50% by weight in the fiberglass section laminate and a resin content of 50% by weight (32 volume percent glass and 68 volume percent resin), and a fiber content of 40% by weight for the polyester section with 60% by weight of the binder resin (46% volume for the polyester fiber and 54% volume for the binder resin). To the binder resin was added 0.5% by weight of the methylethylketone peroxide solution and mixed. Then the binder resin was added to the mold in proportioned amounts to wet out each layer of the reinforcing fiber. The laminate gel time was 30 minutes and the laminate was removed from the mold after two hours. The laminate was held at 23° C for 48 hours and then at 80° C for 24 hours. Subsequently each of the laminates obtained were evaluated by employing the following test procedures:

TENSILE TEST

The tensile test procedures and values were obtained in accordance with ASTM D 638. All specimens were prepared from 3 to 5 layers of the reinforced laminate with a cut width of 0.500 inches.

FLEXURAL TEST

The test procedure used for obtaining the flexural properties of the laminates was in accordance with ASTM D 790. The span for this 3 point test was 8 inches and the width of the specimens was 0.50 inches. The thickness of all specimens was governed by the laminate thickness. All those were applied perpendicular to the plane of the fiber reinforcement all flexural loads given are based on an 8 inch span center load on 0.500 inch bars.

IMPACT TEST

The impact test used was the un-notched Charpy type (ASTM D 256). All loads were applied perpendicular to the plane of the reinforcement layers. Also because of the wide range of thicknesses of the laminates it was necessary to standardize the face thickness of 0.50 inches and to plot the impact load as a function of thickness.

ABRASION TEST

All abrasion tests were run on the Taber abrasion tester using an H22 wheel at 1000 grams weight.

In order to fully appreciate the results presented in the following examples it will be understood that the polyethylene terephthalate fiber used as the reinforcing layer has a density of 1.41 grams per cubic centimeter; whereas the glass fiber has a density of 2.5 grams per cubic centimeter. Accordingly, when using the same weight of polyethylene terephthalate fiber as glass fiber the reinforcement layer is 1.8 times greater in volume with the polyethylene terephthalate fiber than with the glass fiber. This difference in density causes a laminate of the polyethylene terephthalate fiber to have a fiber content of 40% by weight as compared with the fiber content or of the glass woven roving 50% by weight. Moreover a chopped strand fiberglass mat laminate will contain about 25% by weight of fiber. It will be understood that this indicates that for one pound of fiberglass roving used, 1 pound of binder resin will be used and that for 1 pound of fiberglass chopped strand mat used, 3 pounds of binder resin will be used and for 1 pound of the woven polyethylene terephthalate roving used, 1.5 pounds of binder resin will be used in the preparation of the composite laminates of the subject invention. In all examples the weight of each reinforcement fiber layer is equal to the others.

EXAMPLE 1

In this example the following six different embodiments of the polyethylene terephthalate (P) and the fiberglass (F) fiber-reinforced laminates of the invention containing from 4 to 16 fiber layers were produced by the hand lay-up procedure outlined above:

$F(P)_xF$ $2F(P)_x2F$ $3F(P)_x3F$ $F_{x'}(6P)F_{x'}$ $F_{x'}(5P)F_{x'}$ $F_{x'}(4P)F_{x'}$ wherein x equals 1–10 and x' equals 1–6. Also control laminates containing either fiberglass woven roving (F.G.W.R.) reinforcing layers or polyethylene terephthalate (PET) layers were formed.

Figure 3:
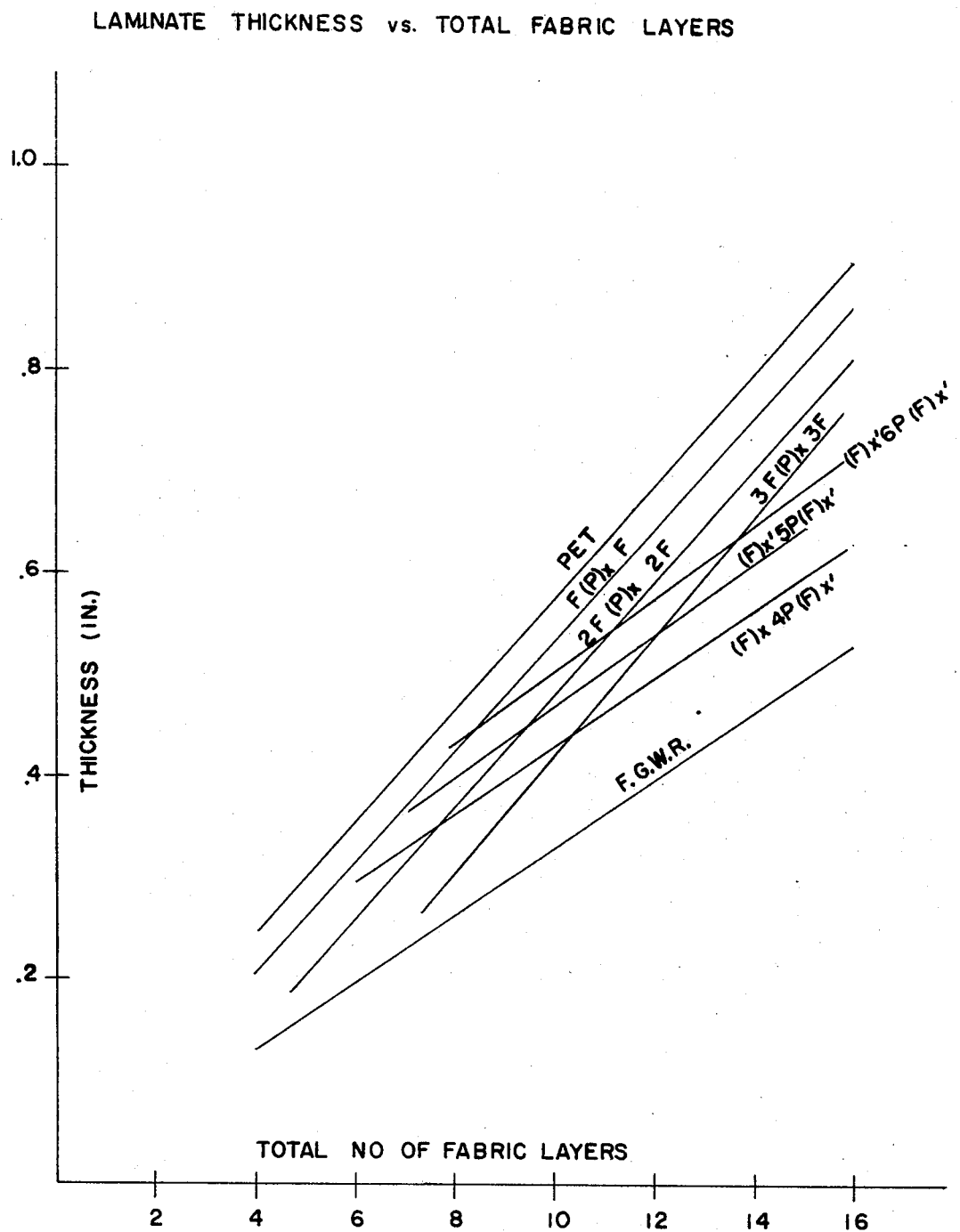
FIG. 3 is a graph showing the relationship between the laminate thickness and the total fabric layers of the composite laminates of the invention and a polyethylene terephthalate (PET) fiber reinforced laminate and a fiberglass woven roving (F.G.W.R.) fiber reinforced laminate used as control laminates.
Figure 4:
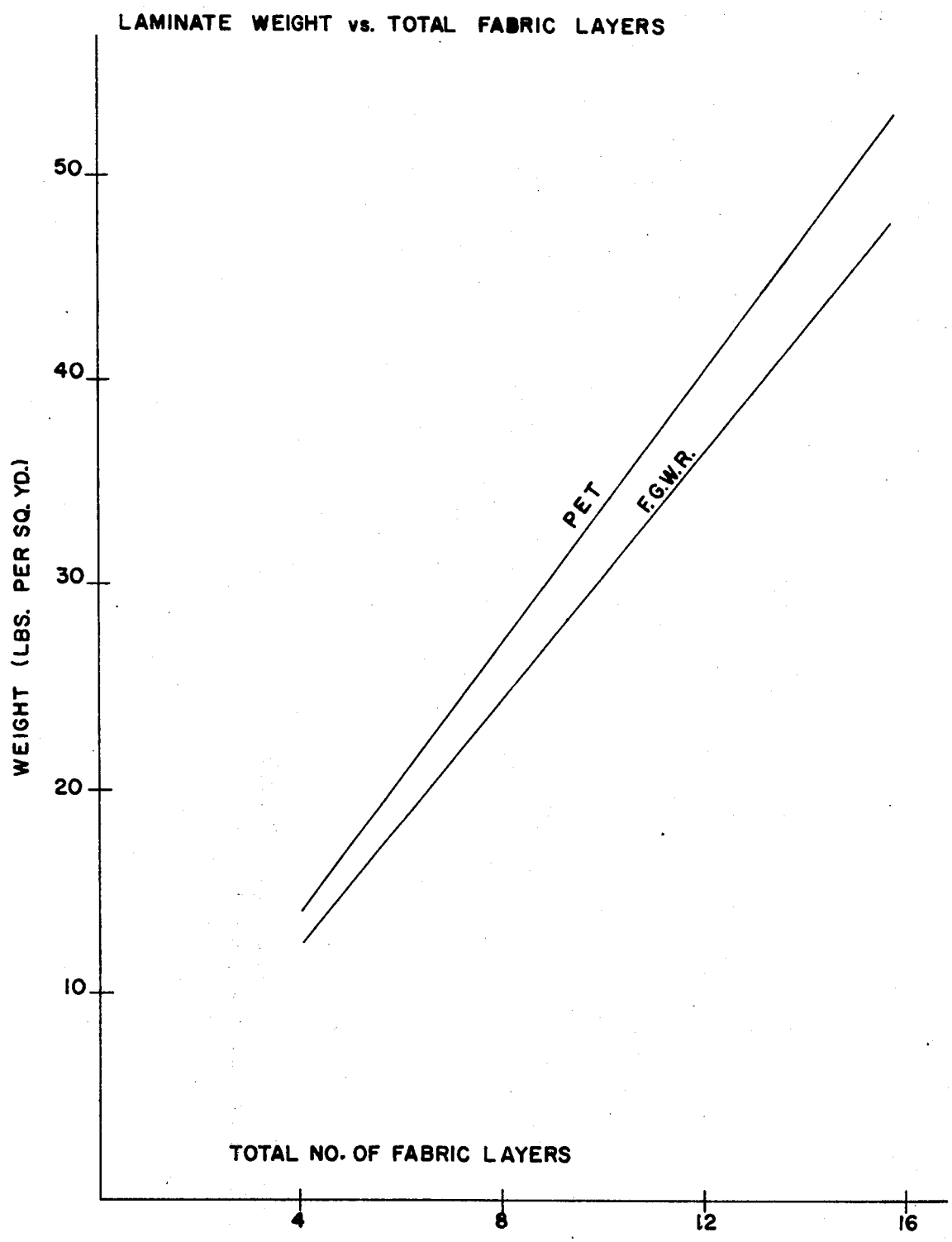
FIG. 4 is a graph showing the relationship of the laminate weight and the total fabric layers of the two control laminates.

The thickness and weight of each laminate was measured and as expected it was found that the thickness and weight increase linearly with an increase in the number of reinforcement layers. The results of these measurements are shown in FIGS. 3 and 4. In FIG. 4 curves for only pure PET and pure F.G.W.R. are shown. Weight combinations of these two materials can be calculated from the two curves.

EXAMPLE 2

Figure 5:
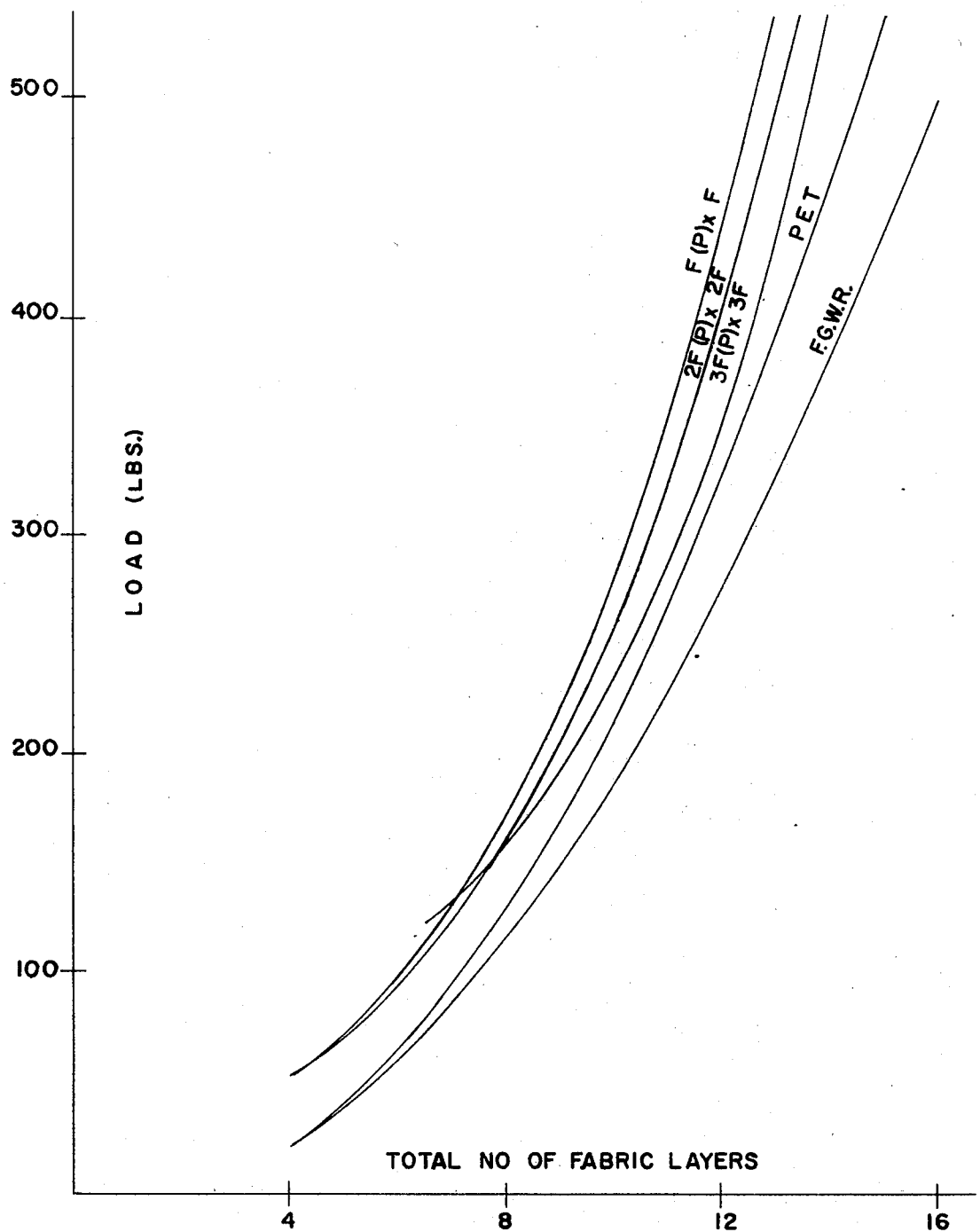
FIG. 5 is a graph showing the relationship between the flexural load and the total fabric layers of the composite laminates of the invention and the control laminates.
Figure 6:
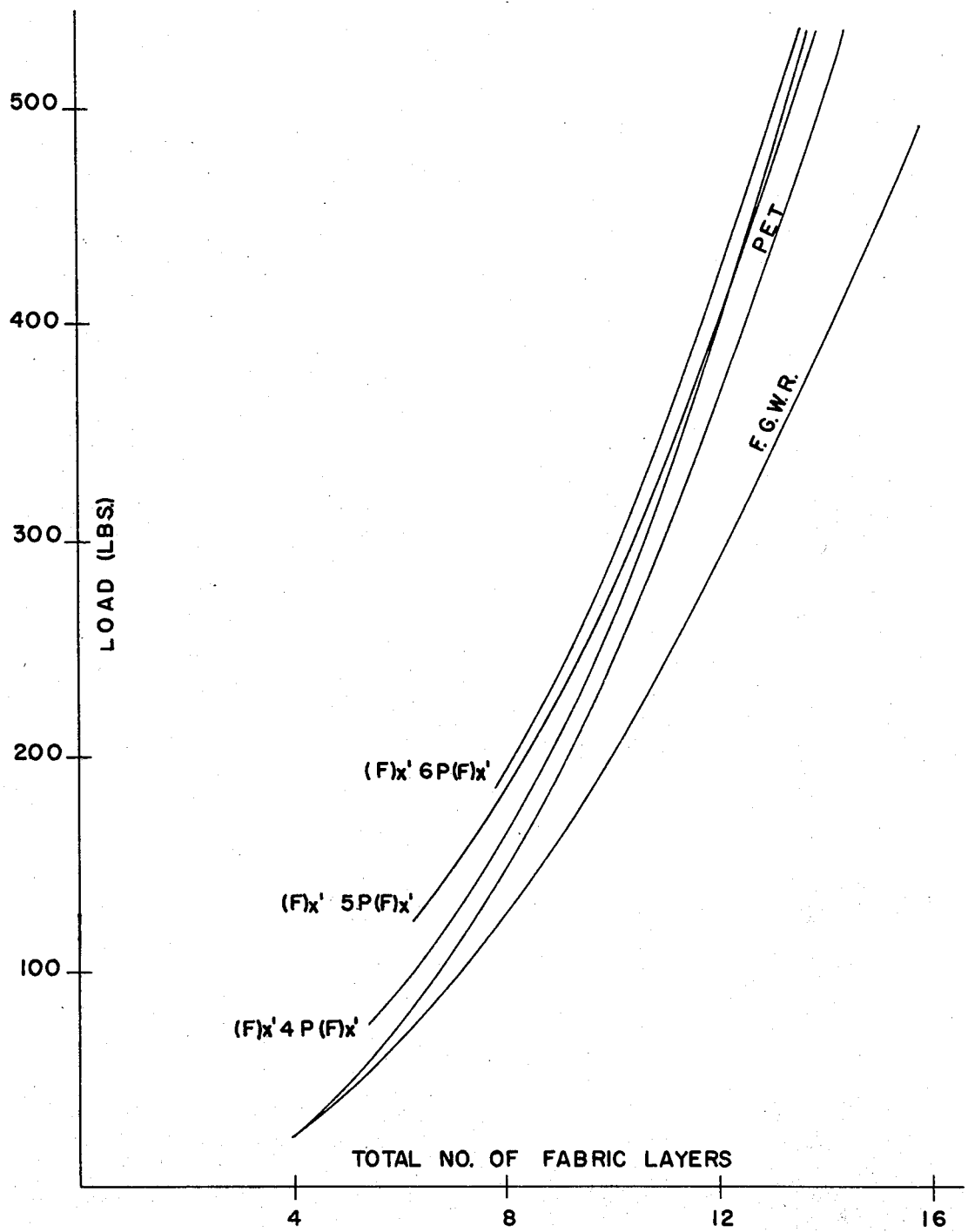
FIG. 6 is a graph showing the relationship between the flexural load and the total fabric layers of a number of additional composite laminates of the invention and the control laminates.

The flexural loads for each of the fiber combinations prepared in Example 1 as well as the control laminates were tested in accordance with ASTM D 790. From FIG. 5 it can be seen that the flexural loads obtained for the laminates of the invention were substantially greater than either control laminate having the same number of total reinforcing fabric layers. Thus eight layers the laminate $F(P)_xF$ had a flexural load more about twice that of the F.G.W.R. laminate and about 1½ times that for the PET laminate. The data plotted in FIG. 6 show that the increase in flexural load is less significant when the number of outer layers of the fiberglass are increased rather than the number of inner layers of polyethylene terephthalate.

EXAMPLE 3

In this example the flexural strength of the laminate produced in Example 1 was determined. The flexural formula for a three-point loading is:

$$S = 1.5 \frac{p\,l}{b\,d^2}$$

wherein
 $S$ = stress
 $p$ = load
 $l$ = span
 $b$ = width
 $d$ = thickness.

Figure 7:
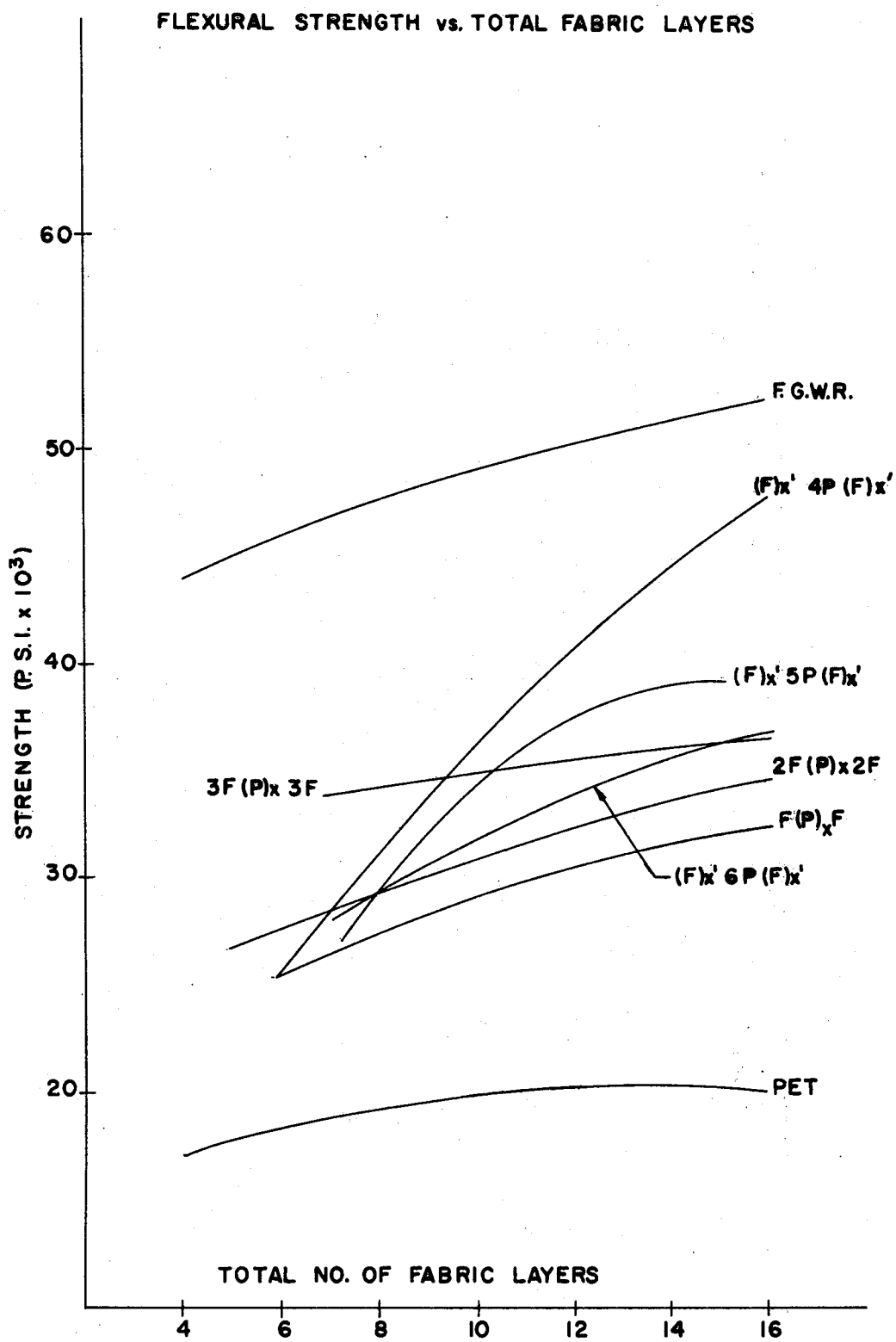
FIG. 7 is a graph showing the relationship between the flexural strength and the total fabric layers for several embodiments of the composite laminates of the invention and the control laminates.

From the data in FIG. 7 it is apparent that the flexural strength of the laminates produced with both fiberglass and polyethylene terephthalate fiber fall between that of the two control laminates, and that a specific geometric arrangement of the layers greatly determines the maximum load obtainable. It will be recognized that the stress (S) in the above formula equal the flexural strength at failure or maximum load of the laminate and that the increased thickness of the polyester containing laminates causes the flexural strength to be reduced.

EXAMPLE 4

One of the most unique aspects of the laminates of this invention is illustrated in this example wherein the flexural modulus of the laminates prepared in Example 1 is plotted against the total number of fabric layers in the laminate. In a pure laminate, that is one containing a single type of fiber reinforcement, the flexural modulus is constant with an increase in total fabric layers. For instance for a pure PET reinforced laminate the flexural modulus is $0.575 \times 10^6$ p.s.i., and for pure woven fiberglass $2.15 \times 10^6$ p.s.i. The formula defining flexural modulus indicates that the modulus is a function of the thickness cubed, i.e., $$E = \frac{L^3 M}{4b\, d^3}$$

wherein
 $E$ = Modulus (p.s.i.)
 $L$ = Span (in.)
 $M$ = Slope of load deflection curve (lbs./in. defection)
 $b$ = Width (in.)
 $d^3$ = Thickness (in.)

Figure 8:
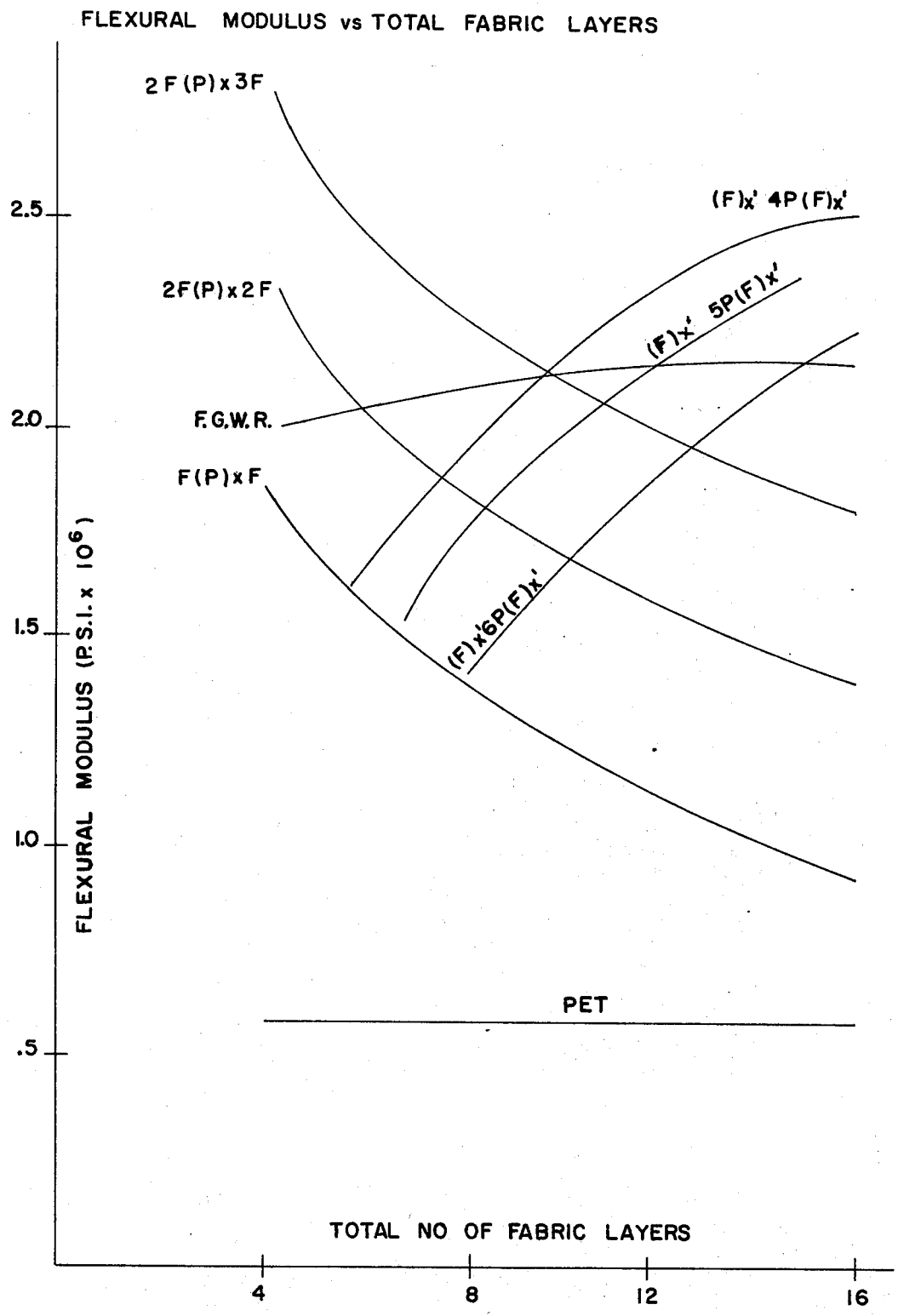
FIG. 8 is a graph showing the relationship between the flexural modulus and the total fabric layers for a number of embodiments of the composite laminate of the subject invention and the control laminates.

As shown in FIG. 8, the flexural modulus generally follow the same trends as the flexural strength. An increase in the number of layers of PET causes the modulus of the PET containing laminates to approach that of the pure PET laminate. Unexpectedly, those laminates where the number of PET layers in the center are less than, equal to, or slightly more than the number of fiberglass layers on either side, the flexural modulus is greater than the flexural modulus of the pure fiberglass fiber reinforced laminate. Moreover, it was found that the stiffness of all laminates of the invention is greater than that of the pure fiberglass reinforced laminates since the thickness of these laminates also contributes to the stiffness.

EXAMPLE 5

Figure 9:
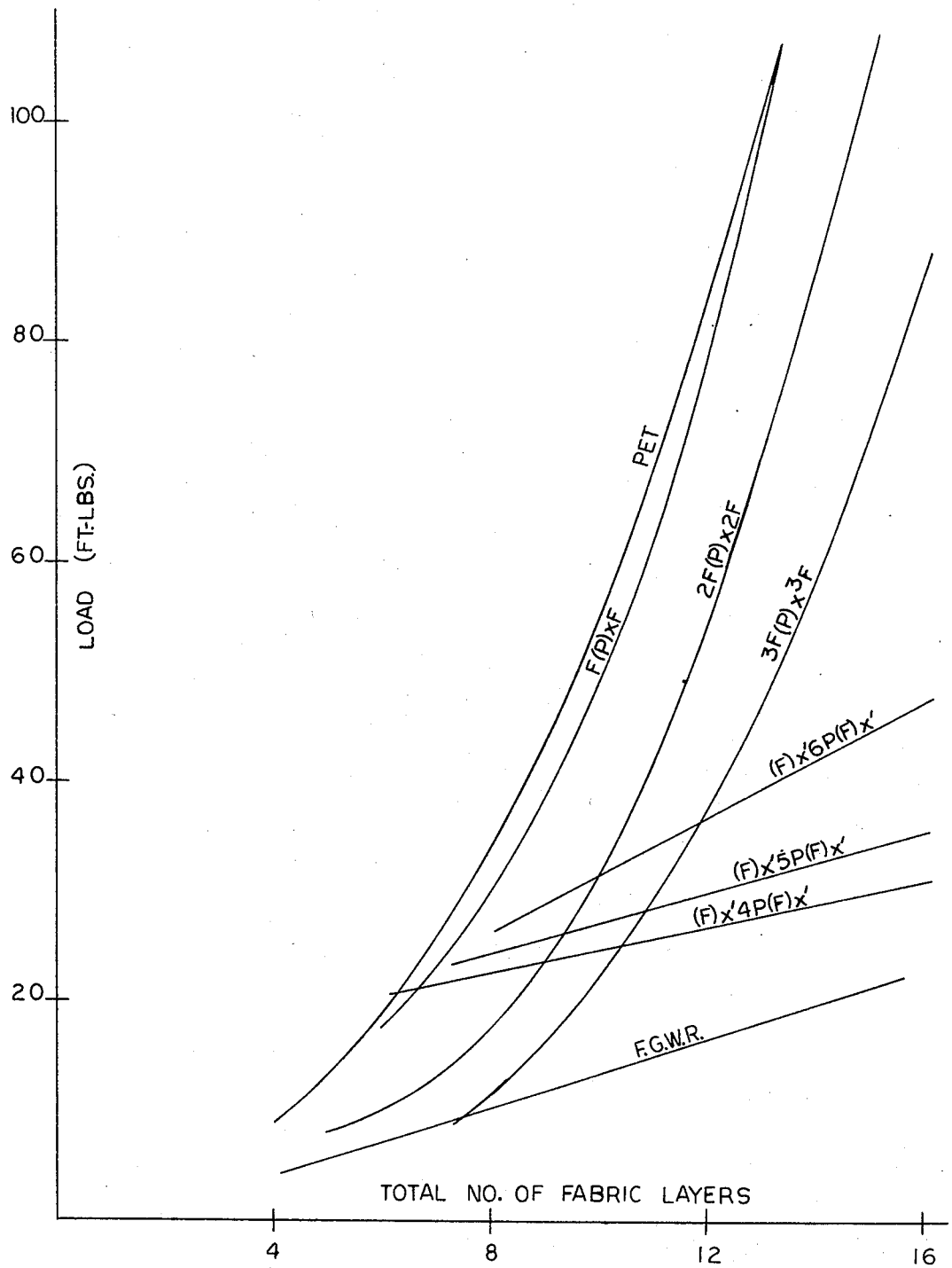
FIG. 9 is a graph showing the relationship between the impact load and the total fabric layers for a number of embodiments of the composite laminate of the invention and the control laminates.

This example illustrates the substantial increase in impact load obtained by the laminates of the invention. Laminates of the type prepared in Example 1 were evaluated by the impact test for Charpy impact designated as ASTM D 256 with the load perpendicular to the planes of the reinforcement layers. In normal practice the impact energy is reported as foot pounds per inch of face width using a standard 0.5 inch thick specimen. In this example, however, all specimens were cut at 0.5 inch face width and the full laminate thickness was used as the test bar thickness. The total energy in ft.-lbs. required to break the ½ inch wide bar was reported as the impact load. It will be seen from FIG. 9 that in each case the addition of the polyethylene terephthalate (PET) fiber increases the impact load as well as the strength of the laminates.

EXAMPLE 6

Figure 10:
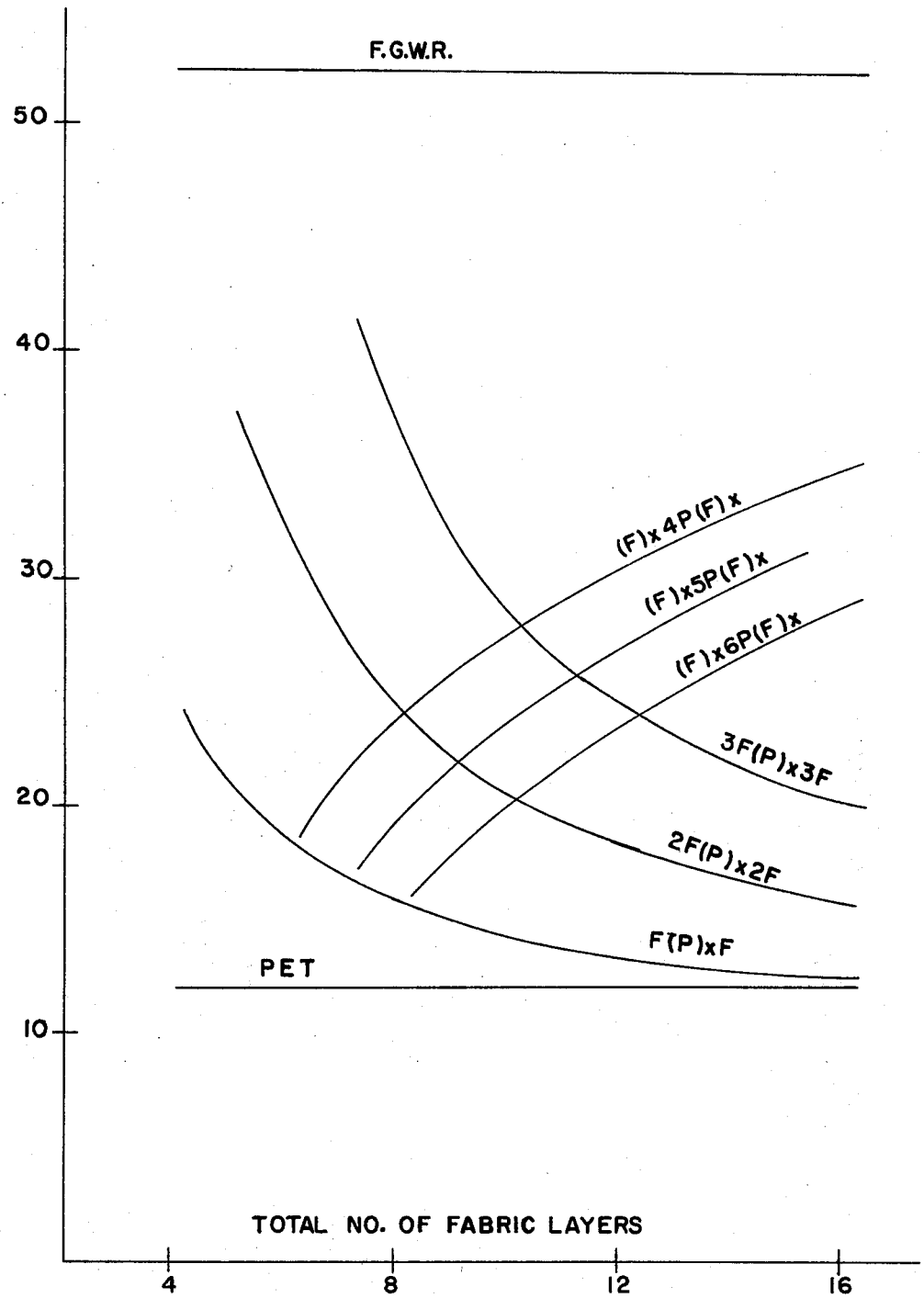
FIG. 10 is a graph showing the relationship between the tensile strength and the total fabric layers for a number of embodiments of the composite laminates of the invention and for the control laminates.

The laminates prepared in Example 1 were tested for their tensile strength in accordance with the test procedure designed ASTM D 638. In these tests all specimens were prepared from 3 to 5 layers of the reinforced laminate with a cut width of 0.500 inches. The tensile strengths were determined experimentally up to 0.75 inch in thickness and the remainder of the values. As shown in FIG. 10 the tensile strength for the laminates reinforced purely with fiberglass woven roving layers was much higher than that of the purely PET reinforced laminates. Tensile strengths of intermediate range are obtained by the arrangements of the reinforcing fibers in accordance with this invention.

Figure 11:
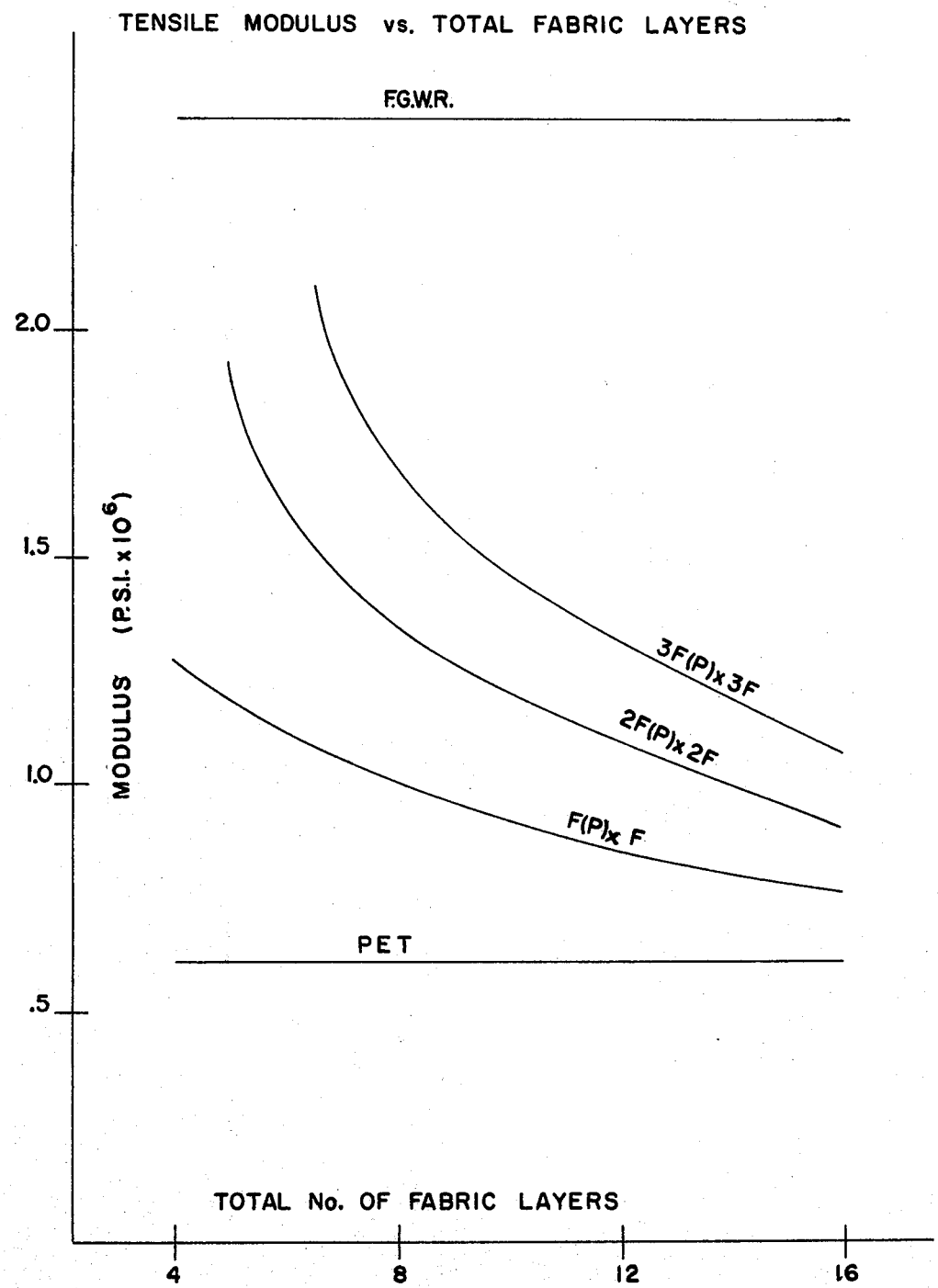
FIG. 11 is a graph showing the relationship between the tensile modulus and the total fabric layers for three embodiments of the composite laminate of the invention and the control laminates.

As shown in FIG. 11 additional tests were also conducted to determine the tensile modulus of the laminates under investigation. From FIG. 11 it will be seen that tensile modulus of the laminates of the invention also falls between that of the two control laminates.

EXAMPLE 7

In this example a plurality of laminates were prepared by using the same lay-up procedure used in the preceding examples, but the layer of polyethylene terephthalate (PET) fabric used was ENCRON woven in a 15 den./fil., 4 × 4 construction at 24.5 oz./sq. yd. The binder resin and fiberglass fabric were the same previously employed. The laminates produced are represented by the following formula:

| A | B | C | D | E |
|---|---|---|---|---|
| P | F | F | P | F |
| P | F | P | F | F |
| P | F | P | P | P |
| P | F | P | P | P |
| P | F | P | F | F |
| P | F | F | P | F |

Several properties of these laminates were evaluated, including the flexural strength, the flexural load support, the flexural deflection, the Izod impact load and the Charpy impact load. All test procedures were made following the same ASTM tests used in the previous examples (the Izod test procedure is given the same ASTM number designation). The results of these tests are given in Table 1.

Table 1

| Laminate | Flexural Strength | Flexural Load Support | Flexural Deflection | Izod Impact Load | Charpy Impact Load |
|---|---|---|---|---|---|
| | psi × 10³ | pounds | in. × 10⁻¹ | ft.-lbs. | ft-lbs. |
| A | 12 | 61.5 | 15.4 | 9.9 | 14.5 |
| B | 34.5 | 44 | 14 | 8 | 9.1 |
| C | 14.5 | 60.5 | 3 | 10.4 | 13.8 |
| D | 20.5 | 83 | 14.4 | 12.1 | 13.7 |

Table 1-continued

| Laminate | Flexural Strength | Flexural Load Support | Flexural Deflection | Izod Impact Load | Charpy Impact Load |
| --- | --- | --- | --- | --- | --- |
| E | 31 | 72 | 6.8 | 10.1 | 12.3 |

From the above data, it is clear that the laminates of this invention possess a unique combination of improved impact load, equal or substantially improved stiffness, and much greater flexural load than the fiberglass reinforced laminates.

EXAMPLE 8

The test for abrasion used in this study was the Taber abrasion test. The wheel used was a H-22 with a 1000 gram weight. Ten laminates each of pure PET and pure F.G.W.R., were prepared and tested. Five ½ inch aluminum plates were tested for comparison purposes. In order to make the test reproducable, the abrasion took place on the side of the laminate that was against the mold to minimize the excess resin on surface. Each specimen was run the full number of cycles from 0 to 2000 cycles, with periodic weight checks.

To calculate the thickness lost during the abrasion test, the weight loss was converted to volume of material lost by dividing the weight loss by the density of the material. Dividing the volume loss by the area of abrasion, the wear depth was obtained.

At 2000 cycles, the abrasion test results were:

|  | Density | Weight Loss gms. | Thickness Loss cm |
| --- | --- | --- | --- |
| Pure PET | 1.24 | 1.17 | 0.105 |
| Pure F.G.W.R. | 1.60 | 3.84 | 0.266 |

From the slopes of the weight loss curves between 1700 and 2000 cycles the rate of abrasion was calculated at:

|  | Density | Weight Loss Rate gm. per 100 cycles | Thickness Loss Rate cm. per 100 cycles |
| --- | --- | --- | --- |
| Pure PET | 1.24 | 0.093 | 0.0083 |
| Pure F.G.W.R. | 1.60 | 0.306 | 0.0212 |

From the above data it is apparent that the abrasion resistance provided by the polyethylene terephthalate fiber reinforcing layer is on the order of at least four times that of the fiberglass reinforcing layer. It will be appreciated that the thickness of the PET layer is about twice that of the fiberglass layer.

EXAMPLE 9

Laminates were prepared from PET and F.G.W.R. of the type used in Example 1 with 6 layers of fabric for the flexural and impact test and 3 layers of fabric for the tensile test. The binder resin used was a chemically resistant unsaturated polyester (Hetron 92 TG, a product of Hooker). The laminates were post cured for 7 days at room temperature and then cut into the various test specimens. These specimens were immersed in the various reagents for 18 days, then removed and rinsed in distilled water. The specimens were tested the same day of removal. The results of these tests are as follows in Tables 2, 3 and 4.

Table 2

Chemical Effect on Tensile Strength

| Test Reagent at 23° C | PET Laminate | | F.G.W.R. Laminate | |
| --- | --- | --- | --- | --- |
|  | Tensile PSI | Strength % | Tensile PSI | Strength % |
| Untreated | 12,000 | 100 | 40,000 | 100 |
| 10% Hydrochloric Acid | 12,000 | 100 | 39,200 | 98 |
| 10% Hydrofluoric Acid | 11,500 | 96 | 22,800 | 57 |
| 10% Sulfuric Acid | 12,500 | 104 | 29,200 | 73 |
| 10% Acetic Acid | 12,250 | 102 | 36,800 | 92 |
| 10% Sodium Hydroxide | 11,500 | 96 | 36,400 | 92 |
| Saturated NaCl Solution | 12,250 | 102 | 34,400 | 86 |
| Distilled $H_2O$ | 12,000 | 100 | 35,600 | 89 |

Table 3

Chemical Effect on Flexural Strength

| Test Reagent at 23° C | PET Laminate | | F.G.W.R. Laminate | |
| --- | --- | --- | --- | --- |
|  | Flexural PSI | Strength % | Flexural PSI | Strength % |
| Untreated | 12,300 | 100 | 36,200 | 100 |
| 10% Hydrochloric Acid | 12,600 | 102 | 34,100 | 97 |
| 10% Hydrofluoric Acid | 11,800 | 96 | 29,000 | 80 |
| 10% Sulfuric Acid | 11,800 | 96 | 26,800 | 74 |
| 10% Acetic Acid | 12,600 | 98 | 39,100 | 108 |
| 10% Sodium Hydroxide | 11,200 | 94 | 24,200 | 67 |
| Saturated NaCL | 12,200 | 99 | 35,800 | 99 |
| Distilled $H_2O$ | 12,400 | 101 | 35,100 | 97 |

Table 4

Chemical Effect on Charpy Impact Load

| Test Reagent at 23° C | PET Laminate | | F.G.W.R. Laminate | |
| --- | --- | --- | --- | --- |
|  | Flexural Ft.-Lbs. | Strength % | Flexural Ft.-Lbs. | Strength % |
| Untreated | 20 | 100 | 7 | 100 |
| 10% Hydrochloric Acid | 17 | 86 | 7 | 101 |
| 10% Hydrofluoric Acid | 21 | 105 | 5 | 75 |
| 10% Sulfuric Acid | 18 | 90 | 7 | 94 |
| 10% Acetic Acid | 19 | 94 | 7 | 105 |
| 10% Sodium Hydroxide | 20 | 100 | 5 | 76 |
| Saturated NaCl | 19 | 93 | 7 | 104 |
| Distilled $H_2O$ | 20 | 98 | 8 | 117 |

It should be noted that, due to the low density of the PET fiber, specimens with equal layers of PET reinforcement have a thickness twice that of the Fiberglass W.R. reinforced specimens and the cut sides of the specimens are nearly twice that of F.G.W.R. laminates.

Also it will be understood that the laminates of this invention will usually have a thickness in a range of from about 1/5 to about 1 inch and a weight range of from about 10 to about 60 pounds per square yard depending on the number of reinforcing fiber layers used. These laminates are suitable for numerous applications where fiberglass-reinforced plastics are conventionally employed as well as in applications where such laminates have been restricted. For example the laminates of the invention can be utilized in boat hulls, chemical storage tank linings, yarn and cloth containers, vehicle bodies, pipes, furniture, plastic hardware components, and the like.

What is claimed is:

1. A fiber-reinforced polymeric resin composite laminate having improved impact strength and stiffness which comprises at least two adjacent reinforcing layers of a saturated polyester fiber arranged between at least two reinforcing layers of fiberglass fiber and bonded together by a synthetic resin, said laminate having a thickness sufficient to provide said improved impact strength and stiffness and the ratio of polyester fiber to fiberglass fiber, on a volume-to-volume basis ranging from 1 : 1 to 20 : 1.

2. The composite laminate of claim 1, wherein the polyester fiber has a tenacity of from about 2 to about 10 grams per denier, an elongation at break of from about 3 to about 50% and a tensile modulus at one percent elongation of from about 60 to about 150 grams per denier and the fiberglass fiber has a tenacity of from about 5 to 8 grams per denier, a tensile modulus of at least about $10 \times 10^6$ p.s.i., and an elongation at break not greater than 3%.

3. The composite laminate of claim 1, wherein the polyester fiber and the fiberglass fiber are in the form of woven fabrics.

4. The composite laminate of claim 1, wherein the ratio of polyester fiber to fiberglass fiber within said composite on a weight to weight basis is on the order of from 1:1.8 to 11:1.

5. The composite laminate of claim 4, wherein the total reinforcing fiber comprises from about 25 to 75% by weight of the laminate.

6. The composite laminate of claim 1, wherein an equal number of fiberglass fiber layers are positioned on each side of the polyester fiber layers.

7. The composite laminate of claim 1, wherein each of the reinforcing layers of fiber extend across the entire width and length of the laminate.

8. The composite laminate of claim 1, wherein the synthetic resin used is a binder resin comprising a thermoplastic or a thermosetting polymer.

9. The composite laminate of claim 1, wherein the synthetic resin is an unsaturated polyester curable with a peroxide catalyst.

10. The composite laminate of claim 1, wherein the fiberglass fiber layers and the polyester fiber layers are arranged in a sequence represented by one of the following formula:

$F(P)_xF$ $2F(P)_x2F$ $3F(P)_x3F$ $F_{x'}(6P)F_{x'}$ $F_{x'}(5P)F_{x'}$ $F_{x'}(4P)F_{x'}$ wherein F represents a fiberglass fiber layer, P represents a polyester fiber layer, $x$ equals 2–10 and $x'$ equals 1–6, the total number of layers in said laminate being from 4 to 16 and an equal number of fiberglass layers being on each side of the polyester fiber layers.

11. The composite laminate of claim 1, wherein at least one reinforcing layer of polyester fiber is arranged on the exteriors of said laminate adjacent to a reinforcing layer of fiberglass fiber.

12. The composite laminate of claim 1, wherein the ratio of polyester fiber to fiberglass fiber within said composite on a weight to weight basis is on the order of from 1:1.8 to 11:1.

13. The composite laminate of claim 12, wherein the total reinforcing fiber comprises from about 25 to 75% by weight of the laminate.

14. A fiber-reinforced polymeric resin composite laminate having improved impact resistance and stiffness which comprises at least one reinforcing layer of saturated polyester fiber arranged in the center of the laminate, at least two reinforcing layers of fiberglass fiber on each side of said reinforcing layer of saturated polyester fiber, and a synthetic resin bonding the layers together, said laminate having a thickness sufficient to provide said improved impact resistance and stiffness and the ratio of polyester fiber to fiberglass fiber, on a volume-to-volume basis ranging from 1 : 1 to 20 : 1.

15. The composite laminate of claim 14, wherein the polyester fiber has a tenacity of from about 2 to about 10 grams per denier, an elongation at break of from about 3 to about 50% and a tensile modulus at one percent elongation of from about 60 to about 150 grams per denier and the fiberglass fiber has a tenacity of from about 5 to 8 grams per denier, a tensile modulus of at least about $10 \times 10^6$ p.s.i., and an elongation at break not greater than 3%.

16. The composite laminate of claim 14, wherein the polyester fiber and the fiberglass fiber are in the form of woven fabrics.

17. The composite laminate of claim 14, wherein an equal number of fiberglass fiber layers are positioned on each side of the polyester fiber layers.

18. The composite laminate of claim 14, wherein each of the reinforcing layers of fiber extend across the entire width and length of the laminate.

19. The composite laminate of claim 14, wherein the synthetic resin used is a binder resin comprising a thermoplastic or a thermosetting polymer.

20. The composite laminate of claim 14, wherein the synthetic resin is an unsaturated polyester curable with a peroxide catalyst.

21. The composite laminate of claim 14, wherein the fiberglass fiber layers and the polyester fiber layers are arranged in a sequence represented by one of the following formula:

$F(P)_xF$ $2F(P)_x2F$ $3F(P)_x3F$ $F_{x'}(6P)F_{x'}$ $F_{x'}(5P)F_{x'}$ $F_{x'}(4P)F_{x'}$ wherein F represents a fiberglass fiber layer, P represents a polyester fiber layer, $x$ equals 1–10 and $x'$ equals 1–6, the total number of layers in said laminate being from 4 to 16 and an equal number of fiberglass layers being on each side of the polyester fiber layers.

22. The composite laminate of claim 14, wherein at least one reinforcing layer of polyester fiber is arranged on the exteriors of said laminate adjacent to a reinforcing layer of fiberglass fiber.

* * * * *